(12) United States Patent
Fukushima et al.

(10) Patent No.: US 7,632,606 B2
(45) Date of Patent: Dec. 15, 2009

(54) ELECTROLYTE HAVING A POLYMER AND BATTERY USING IT

(75) Inventors: Yuzuru Fukushima, Miyagi (JP);
Yusuke Fujishige, Fukushima (JP);
Fumiko Kimura, Fukushima (JP);
Takuya Endo, Kanagawa (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 10/791,401

(22) Filed: Mar. 2, 2004

(65) Prior Publication Data

US 2005/0014069 A1 Jan. 20, 2005

(30) Foreign Application Priority Data

Mar. 4, 2003 (JP) ............................ P2003-057460

(51) Int. Cl.
*H01M 6/14* (2006.01)
(52) U.S. Cl. .................. 429/303; 429/324; 429/326
(58) Field of Classification Search ................ 429/324, 429/326, 330, 331, 332, 336, 303
See application file for complete search history.

(56) References Cited

U.S. PATENT DOCUMENTS

| 6,821,675 B1* | 11/2004 | Morigaki et al. | 429/218.1 |
| 7,393,476 B2* | 7/2008 | Shiozaki et al. | 252/521.2 |
| 2004/0048165 A1* | 3/2004 | Coowar | 429/332 |
| 2005/0181283 A1* | 8/2005 | Pugh et al. | 429/231.95 |
| 2006/0014078 A1* | 1/2006 | Swoyer et al. | 429/231.9 |

FOREIGN PATENT DOCUMENTS

| JP | 2001-057234 | * | 2/2001 |
| JP | 2001-155790 | | 6/2001 |
| JP | 2001-167797 | | 6/2001 |
| JP | 2002-015771 | * | 1/2002 |
| JP | 2002-324580 | | 11/2002 |
| JP | 2003-100299 | | 4/2003 |

OTHER PUBLICATIONS

Japanese Office Action dated Dec. 8, 2006.

* cited by examiner

*Primary Examiner*—Raymond Alejandro
(74) *Attorney, Agent, or Firm*—Sonnenschein Nath & Rosenthal LLP

(57) ABSTRACT

An electrolyte whose battery capacity, cycle characteristics, load characteristics, and low temperature characteristics are all excellent, and a battery using it. A cathode and an anode are layered and wound with a separator and electrolyte layer in between. The electrolyte layer contains an electrolytic solution containing at least one from the group consisting of vinylethylene carbonate and its derivatives in the range of 0.05 wt % to 5 wt % in total and a polymer. Therefore, chemical stability of the electrolyte layer is improved. It is preferable that the electrolytic solution further contains ethylene carbonate and propylene carbonate with a mass ratio of ethylene carbonate to propylene carbonate ranging from about 15/85 to about 75/25.

4 Claims, 8 Drawing Sheets

ELECTROLYTE HAVING A POLYMER AND BATTERY USING IT

RELATED APPLICATION DATA

The present application claims priority to Japanese Application(s) No(s). P2003-057460 filed Mar. 4, 2003, which application(s) is/are incorporated herein by reference to the extent permitted by law.

BACKGROUND OF THE INVENTION

1. Field of the Invention

The present invention relates to an electrolyte containing an electrolytic solution and a high molecular weight compound, and a battery using it.

2. Description of the Related Art

In recent years, many portable electronic devices such as a mobile phone and a laptop computer have been introduced. Downsizing and weight saving of these devices have been made. Along with these situations, as a portable power source for these electronic devices, a lithium ion secondary battery has attracted attention. Specially, a lithium ion secondary battery, wherein a gelatinous electrolyte in which an electrolytic solution is held or diffused in a high molecular weight compound is used has attracted attention as a next-generation battery because of the following reason. That is, there is no danger of leak, and a film exterior member can be used. Therefore, the battery, whose weight and thickness can be decreased, and whose freedom of shape is high can be realized.

In order to improve ion conductivity of the lithium ion secondary battery at low temperatures, solvents such as dimethyl carbonate, ethyl methyl carbonate, and diethyl carbonate are very effective, since they have high solidifying points and low viscosity. Therefore, in a lithium ion secondary battery, wherein only the electrolytic solution is used as an electrolyte, ethylene carbonate which is electrochemically stable and has a high dielectric constant and so on are used as a main solvent, and a low viscosity solvent such as dimethyl carbonate is mixed with such a main solvent. A battery capacity, cycle characteristics, load characteristics, and low temperature characteristics are thereby improved.

However, the solvent such as dimethyl carbonate cannot be used in large quantity for the secondary battery wherein the gelatinous electrolyte is used, particularly for the secondary battery wherein the film exterior member is used. The solvent such as dimethyl carbonate has a low compatibility with high molecular weight compounds, and has a low boiling point. Therefore, when using the solvent such as dimethyl carbonate, an inner pressure of the battery might be raised, and swollenness of the battery might be caused. Consequently, in the secondary battery using the film exterior member, a mixed solvent in which ethylene carbonate and propylene carbonate are mixed is widely used (for example, refer to Japanese Unexamined Patent Application Publication No. 2001-167797 and Japanese Unexamined Patent Application Publication No. 2001-155790).

When using such a mixed solvent, low temperature characteristics and load characteristics can be improved by, for example, raising a mixing rate of propylene carbonate. However, in this case, an initial charge and discharge efficiency is lowered, resulting in extreme lowering of the battery capacity. Further, cycle characteristics tend to deteriorate as well. As above, the conventional gelatinous electrolyte has a problem that excellent battery capacity, cycle characteristics, load characteristics, and low temperature characteristics cannot be obtained at once.

SUMMARY OF THE INVENTION

The invention has been achieved in consideration of such a problem, and it is an object of the invention to provide an electrolyte whose battery capacity, cycle characteristics, load characteristics, and low temperature characteristics are all excellent, and a battery using it.

An electrolyte according to the invention contains an electrolytic solution containing at least one from the group consisting of vinylethylene carbonate and its derivatives in the range of 0.05 wt % to 5 wt % in total and a high molecular weight compound.

A battery according to the invention comprises a cathode; an anode; and an electrolyte, wherein the electrolyte contains an electrolytic solution containing at least one from the group consisting of vinylethylene carbonate and its derivatives in the range of 0.05 wt % to 5 wt % in total and a high molecular weight compound.

The electrolyte according to the invention contains at least one from the group consisting of vinylethylene carbonate and its derivatives in the range of 0.05 wt % to 5 wt % in total. Therefore, excellent chemical stability can be obtained.

In the battery according to the invention, the electrolyte of the invention is used. Therefore, excellent battery capacity, cycle characteristics, load characteristics, and low temperature characteristics can be obtained.

Other and further objects, features and advantages of the invention will appear more fully from the following description.

DETAILED DESCRIPTION OF THE PREFERRED EMBODIMENT

Figure 1:
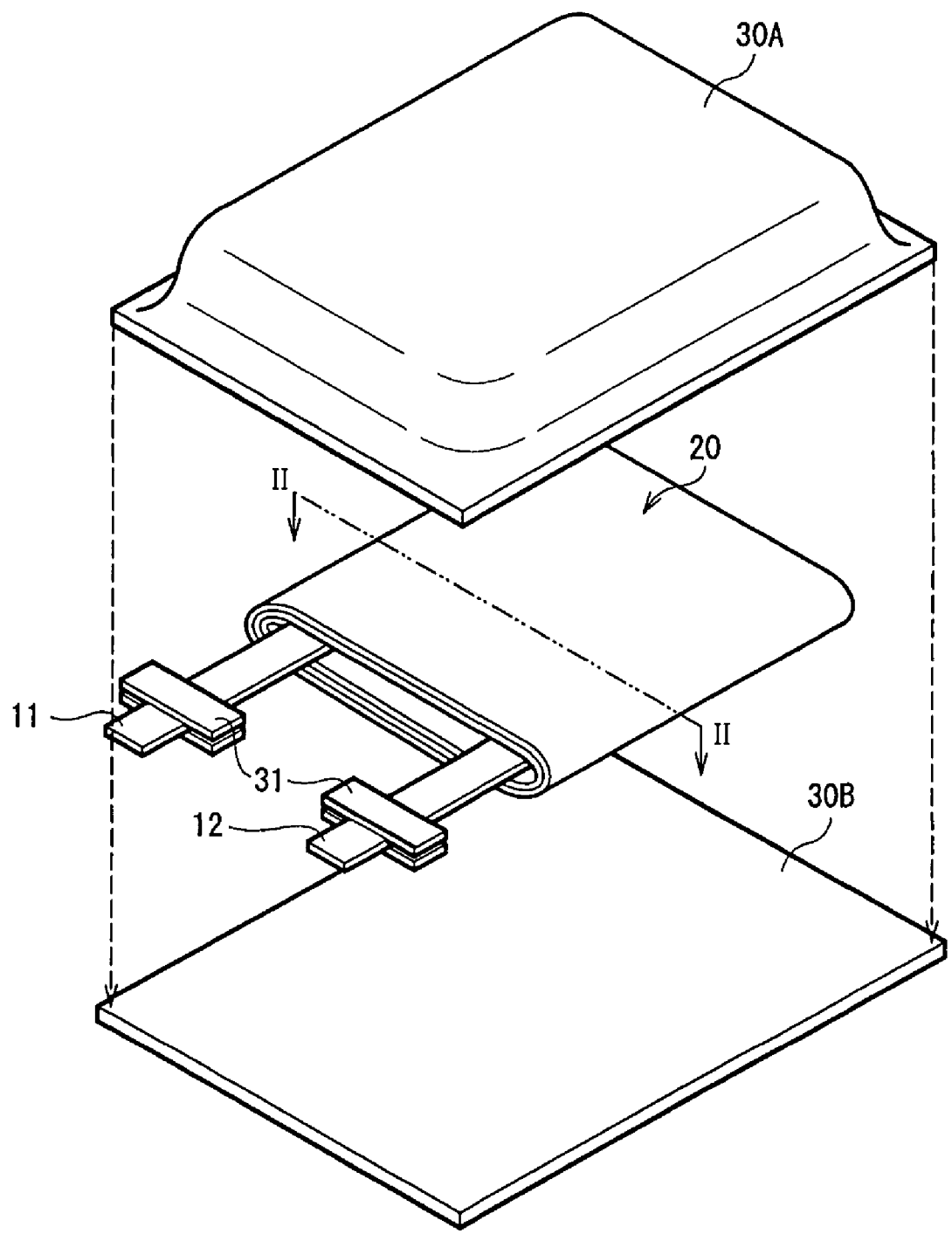
FIG. 1 is an oblique perspective figure which shows a construction of a secondary battery according to an embodiment of the invention.

An embodiment of the invention will be described in detail hereinbelow with reference to the drawings.

An electrolyte according to the embodiment of the invention is, for example, so-called gel, wherein an electrolytic solution is diffused or held in a holding body. The holding body is made of, for example, a high molecular weight compound. Examples of the high molecular weight compound include ones which contain polyvinylidene fluoride, polyethylene oxide, polypropylene oxide, poly acrylic nitrile, and poly methacrylic nitrile in recurring unit. A mixture of one or more of them can be used. Specially, it is preferable to use polyvinylidene fluoride or a copolymer, wherein hexafluoro propylene is introduced in polyvinylidene fluoride.

The electrolytic solution contains, for example, a solvent and a lithium salt as the electrolyte salt dissolved in this solvent. In addition, an additive can be contained as necessary. The solvent contains a mixture of at least one from the group consisting of vinylethylene carbonate and its derivatives and other nonaqueous solvents. In order to improve chemical stability and obtain excellent capacity, cycle characteristics, load characteristics, and low temperature characteristics, a total content of vinylethylene carbonate and its derivatives in the electrolytic solution is set to the range of 0.05 wt % to 5 wt %.

As other nonaqueous solvent, conventionally used various nonaqueous solvents can be used. Concrete examples of the other nonaqueous solvent are ethylene carbonate, propylene carbonate, γ-butyrolactone, dimethyl carbonate, diethyl carbonate, ethyl methyl carbonate, dipropyl carbonate, ethyl propyl carbonate, and one wherein hydrogen of these carbonic acid esters is substituted with halogen. A mixture of one or more of them can be used. In addition, as an additive, 2, 4-difluoro anisole can be mixed with them.

As other nonaqueous solvent, it is especially preferable to use ethylene carbonate and propylene carbonate. These solvents are electrochemically stable, and have high dielectric constant. In addition, these solvents have high compatibility with high molecular weight compounds, and have high boiling points. Therefore, even when using these solvents for a secondary battery, wherein a film exterior member is used, there is no danger that inner pressure of the battery is raised and the battery is swollen. Specially, it is preferable that a mass ratio of ethylene carbonate and propylene carbonate is in the range of ethylene carbonate:propylene carbonate=15-75:85-25. When ethylene carbonate is small in quantity, cycle characteristics and capacity are lowered. Meanwhile, when propylene carbonate is small in quantity, low temperature characteristics and load characteristics are lowered.

It is preferable that the total content of ethylene carbonate and propylene carbonate in the electrolytic solution is 95 wt % or more. When a low viscosity solvent such as dimethyl carbonate, diethyl carbonate, and ethyl methyl carbonate is contained, a content of the low viscosity solvent is preferably small in quantity. These low viscosity solvents have low compatibility with high molecular weight compounds, and have low boiling points. Therefore, when using these low viscosity solvents for the secondary battery, wherein the film exterior member is used, there is a danger that inner pressure of the battery is raised, and the battery is swollen.

Examples of the lithium salt include $LiBF_4$, $LiPF_6$, $LiAsF_6$, $LiClO_4$, $LiCF_3SO_3$, $LiN(CF_3SO_2)_2$, $LiN(C_2F_5SO_2)_2$, $LiC(CF_3SO_2)_3$, $LiAlCl_4$, and $LiSiF_6$.

The electrolyte having such a construction can be manufactured, for example, through firstly preparing an electrolytic solution by dissolving an electrolyte salt in a solvent, mixing this electrolytic solution, a high molecular weight compound and a diluent solvent, and then volatilizing the diluent solvent. Otherwise, the electrolyte having such a construction can be manufactured, for example, by firstly preparing an electrolytic solution, mixing this electrolytic solution with monomers, a starting material for a high molecular weight compound, and polymerizing the monomers.

This electrolyte is used, for example, for a secondary battery as below.

FIG. 1 shows an exploded view showing a construction of the secondary battery. The secondary battery has a construction, wherein an electrode winding body 20 on which a cathode lead 11 and an anode lead 12 are attached is housed inside of film exterior members 30A and 30B. A size, a weight, and a thickness of the secondary battery can be reduced.

The cathode lead 11 and the anode lead 12 are attached on respective ends of after-mentioned cathode current collector 21A and anode current collector 22A in the longitudinal direction. The cathode lead 11 and the anode lead 12 are directed from inside to outside of the exterior members 30A and 30B, and, for example, are derived in the same direction. The cathode lead 11 and the anode lead 12 are respectively made of a metal material such as aluminum (Al), copper (Cu), nickel (Ni), and stainless, and are respectively in the shape of a thin plate or in the shape of a net.

The exterior members 30A and 30B are made of an aluminum laminated film in the shape of a rectangle, wherein, for example, a nylon film, an aluminum foil, and a polyethylene film are bonded together in this order. The exterior members 30A and 30B are, for example, arranged so that their polyethylene film sides and the electrode winding body 20 are faced, and respective outer edge parts are fusion bonded or adhered by an adhesive to each other. Adhesive films 31 to protect from outside air intrusion are inserted between the exterior member 30A and the cathode lead 11, and the exterior member 30B and the cathode lead 11, and the exterior member 30A and the anode lead 12, and the exterior member 30B and the anode lead 12. The adhesive film 31 is made of a material having contact properties in relation to the cathode lead 11 and the anode lead 12. For example, the adhesive film 31 is made of a polyolefin resin such as polyethylene, polypropylene, modified polyethylene, and modified polypropylene.

The exterior members 30A and 30B can be made of a laminated film having other structure, a high molecular weight film such as polypropylene, or a metal film, instead of the aluminum laminated film.

Figure 2:
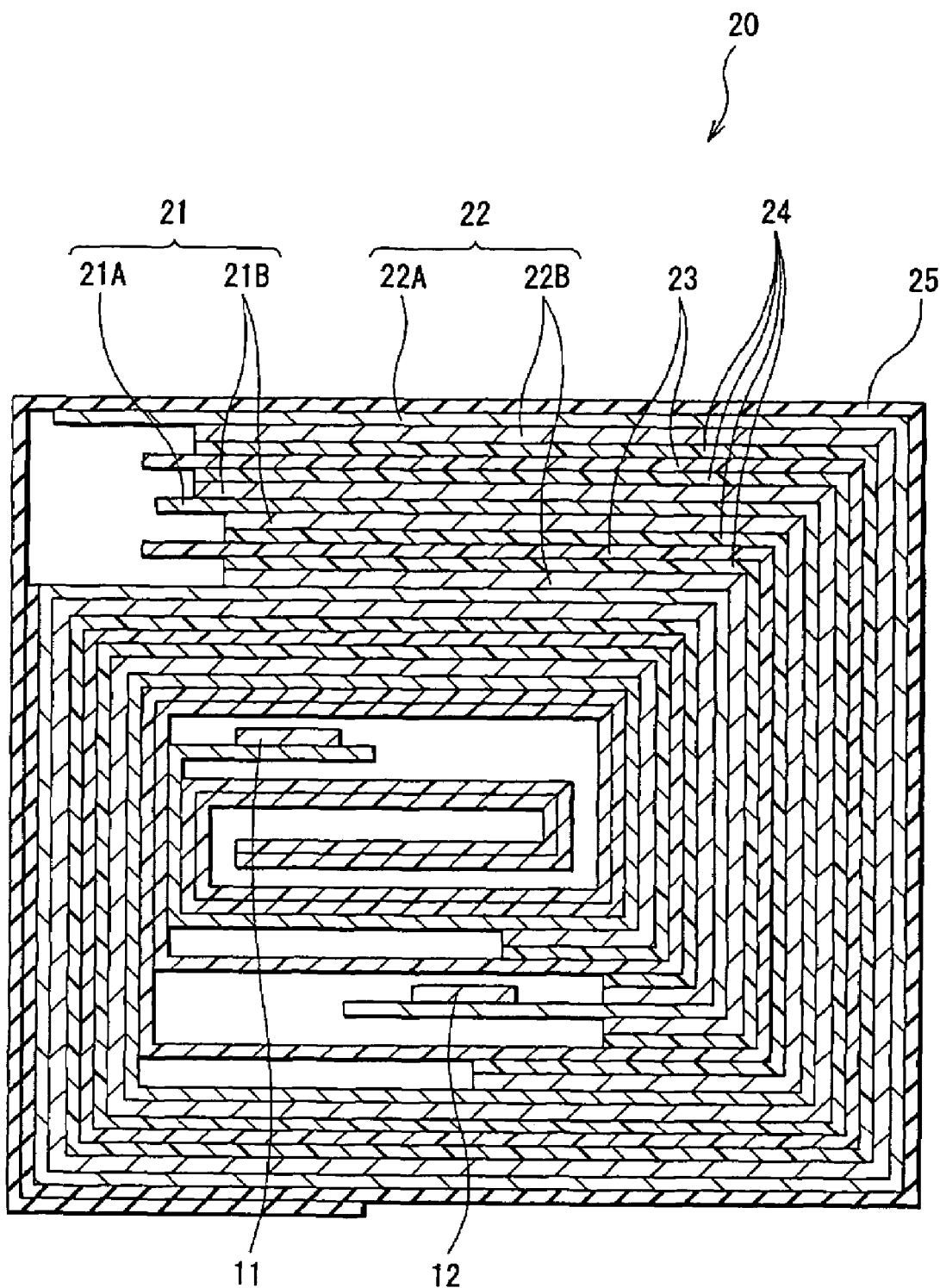
FIG. 2 is a cross sectional view which shows a construction taken along line II-II of an electrode winding body illustrated in FIG. 1.

FIG. 2 is a view showing a cross sectional structure taken along line II-II of the electrode winding body 20 illustrated in FIG. 1. The electrode winding body 20 is formed by layering and winding a cathode 21 and an anode 22 with a separator 23 and electrolyte layer 24 in between. An outermost part of the electrode winding body 20 is protected by a protective tape 25.

The cathode 21 comprises, for example, a cathode current collector 21A and cathode mixture layer 21B provided on both sides or on a single side of the cathode current collector 21A. The cathode current collector 21A is made of, for example, aluminum, nickel, or stainless.

The cathode mixture layer 21B contains, for example, one or more cathode materials capable of inserting and extracting lithium as a cathode active material. In addition, the cathode mixture layer 21B can also contain a conductive agent such as carbon materials and a binder such as polyvinylidene fluoride as necessary. As a cathode material capable of inserting and extracting lithium, for example, lithium complex oxides containing lithium and transition metals are preferable. Since the lithium complex oxide can generate a high voltage and have a high density, high capacity can be obtained. As the lithium complex oxide, one which contains at least one from the group consisting of cobalt (Co), nickel, manganese (Mn), iron (Fe), vanadium (V), and titanium (Ti) as a transition metal is preferable. Concrete examples of the lithium complex oxide include $LiCoO_2$, $LiNiO_2$, $LiMn_2O_4$, $LiNi_{0.5}Co_{0.5}O_2$, and $LiNi_{0.5}Co_{0.3}Mn_{0.2}O_2$. In addition, phosphate compounds such as $LiFePO_4$ and $LiFe_{0.5}Mn_{0.5}PO_4$ can be also cited.

As the cathode 21 does, the anode 22 comprises, for example, the anode current collector 22A and anode mixture layer 22B provided on both sides or on a single side of the anode current collector 22A. The anode current collector 22A is made of, for example, copper, nickel, or stainless.

The anode mixture layer 22B contains, for example, one or more anode materials capable of inserting and extracting lithium as an anode active material. In addition, the anode mixture layer 22B can also contain a binder similar to in the cathode 21 as necessary. Examples of the anode material capable of inserting and extracting lithium include carbon materials, metal oxides, and high molecular weight materials. Examples of the carbon materials include artificial graphite, natural graphite, graphitizable carbon, and non-graphitizable carbon. Examples of the metal oxides include iron oxide, ruthenium oxide, molybdenum oxide, and tungstic oxide. Examples of the high molecular weight materials include polyacetylene and polypyrrole.

Examples of the anode material capable of inserting and extracting lithium include simple substances, alloys, and compounds of metal elements or metalloid elements which can form an alloy with lithium. The alloys include alloys consisting of two or more metal elements and, in addition, alloys consisting of one or more metal elements and one or more metalloid elements. Structures of the materials include a solid solution structure, a eutectic (eutectic mixture) structure, an intermetallic compound structure, and a concomitant state comprised of two or more of the foregoing structures.

Examples of the metal elements or the metalloid elements which can form an alloy with lithium include magnesium (Mg), boron (B), arsenic (As), aluminum, gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd) and platinum (Pt). Examples of alloys or compounds thereof include ones which are expressed by a chemical formula of $Ma_sMb_tLi_u$ or a chemical formula of $Ma_pMc_qMd_r$. In these chemical formulas, Ma represents at least one of metal elements and metalloid elements capable of forming an alloy with lithium, Mb represents at least one of metal elements and metalloid elements other than lithium and Ma, Mc represents at least one of nonmetallic elements, and Md represents at least one of metal elements and metalloid elements other than Ma. Values of s, t, u, p, q, and r satisfy $s>0$, $t\geqq0$, $u\geqq0$, $p>0$, $q>0$, and $r\geqq0$, respectively.

Specially, simple substances, alloys, or compounds of metal elements or metalloid elements in Group 4B in the short period periodic table are preferable. Silicon and tin, or their alloys and compounds are particularly preferable. These materials can be crystalline or amorphous ones.

Concrete examples of such alloys and compounds include $LiAl$, $AlSb$, $CuMgSb$, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leqq2$), $SnO_w$ ($0<w\leqq2$), $SnSiO_3$, $LiSiO$, and $LiSnO$.

The separator 23 is intended to separate the cathode 21 from the anode 22, prevent current short circuit due to contact of the both electrodes, and let through lithium ions. The separator 23 is constructed of, for example, a porous film made of a synthetic resin comprised of, e.g. polytetrafluoroethylene, polypropylene, or polyethylene, or a porous film made of inorganic materials such as a ceramics nonwoven cloth. The separator 23 can have a structure in which two or more porous films are layered.

The electrolyte layer 24 is made of the electrolyte according to this embodiment. Therefore, in this secondary battery, excellent battery capacity, cycle characteristics, load characteristics, and low temperature characteristics can be obtained at once. In addition, swollenness of the battery can be inhibited.

The secondary battery having the foregoing construction can be, for example, manufactured as follows.

First, for example, a cathode material capable of inserting and extracting lithium, a conductive agent, and a binder are mixed. A carrier fluid such as N-methyl-2-pyrrolidone is added to that mixture to prepare a cathode mixture slurry. The cathode mixture slurry is applied to both sides or a single side of the cathode current collector 21A, dried, and compression-molded to form the cathode mixture layer 21B. In result, the cathode 21 is fabricated.

Next, an anode material capable of inserting and extracting lithium and a binder are mixed. A carrier fluid such as N-methyl-2-pyrrolidone is added to that mixture to prepare an anode mixture slurry. After that, the anode mixture slurry is applied to both sides or a single side of the anode current collector 22A, dried, and compression-molded to form the anode mixture layer 22B. In result, the cathode 22 is fabricated.

Subsequently, for example, the electrolyte layer 24 is formed on the cathode 21 and the anode 22, respectively. After that, the cathode lead 11 is attached on the cathode current collector 21A by welding, and the anode lead 12 is attached on the anode current collector 22A by welding.

Next, the cathode 21 and the anode 22, wherein the electrolyte layer 24 are formed respectively are layered and wound with the separator 23 in between. After that, the protective tape 25 is bonded to an outermost periphery of the winding body to form the electrode winding body 20.

Finally, for example, the electrode winding body 20 is sandwiched between the exterior member 30A and the exterior member 30B. Outer edge parts of the exterior members 30A and 30B are contacted to each other through fusion bonding by heat or the like to enclose the electrode winding body 20. In this regard, the adhesive films 31 are inserted between the cathode lead 11, the anode lead 12 and the exterior members 30A, 30B. The secondary battery shown in FIGS. 1 and 2 is thereby completed.

This secondary battery acts as follows.

In this secondary battery, when charged, lithium ions are extracted from the cathode 21, and are inserted in the anode 22 through the electrolyte layer 24. When discharged, for example, lithium ions are extracted from the anode 22, and are inserted in the cathode 21 through the electrolyte layer 24. In this regard, since the electrolytic solution contains at least one from the group consisting of vinylethylene carbonate and its derivatives in the range of 0.05 wt % to 5 wt % in total, chemical stability of the electrolyte is improved. Therefore, excellent battery capacity, cycle characteristics, load characteristics, and low temperature characteristics can be obtained.

As above, according to this embodiment, since the electrolyte contains the electrolytic solution containing at least one from the group consisting of vinylethylene carbonate and its derivatives in the range of 0.05 wt % to 5 wt % in total, chemical stability of the electrolyte can be improved. Therefore, when using this electrolyte, the secondary battery whose capacity, cycle characteristics, load characteristics, and low temperature characteristics are all excellent, and whose swollenness can be inhibited can be obtained. In result, the invention can contribute to development of the industries involved in portable electronic devices and so on.

In particular, when the electrolytic solution further contains ethylene carbonate and propylene carbonate by a mass ratio of ethylene carbonate:propylene carbonate=15-75:85-25, higher effects can be obtained.

EXAMPLES

Further, descriptions will be given in detail of concrete examples of the invention.

As Examples 1-15, secondary batteries shown FIGS. 1 and 2 were fabricated. Therefore, descriptions will be given with reference to FIGS. 1 and 2 by using the same symbols.

First, 92 wt % of cobalt acid lithium ($LiCoO_2$) as a cathode material capable of inserting and extracting lithium, 3 wt % of polyvinylidene fluoride as a binder, and 5 wt % of powder graphite as a conductive agent were mixed to prepare a cathode mixture. Subsequently, the cathode mixture was diffused in N-methyl-2-pyrrolidone, which is a carrier fluid, to obtain a cathode mixture slurry. After that, the cathode mixture slurry was uniformly applied to both sides of the cathode current collector 21A made of aluminum, dried, and compression-molded to form the cathode mixture layer 21B. In result, the cathode 21 was fabricated.

91 wt % of artificial graphite as an anode material capable of inserting and extracting lithium and 9 wt % of polyvinylidene fluoride as a binder were mixed to prepare an anode mixture. Next, the anode mixture was diffused in N-methyl-2-pyrrolidone, which is a carrier fluid, to obtain an anode mixture slurry. The anode mixture slurry was uniformly applied to both sides of the anode current collector 22A made of copper, dried, and compression-molded to form the cathode mixture layer 22B. In result, the cathode 22 was fabricated.

Next, vinylethylene carbonate (VEC) was added to a mixture of ethylene carbonate (EC) and propylene carbonate (PC) to form a solvent. As an electrolyte salt, $LiPF_6$ was dissolved in the solvent by a concentration of 0.7 mol/kg to prepare an electrolytic solution. Mass ratios of ethylene carbonate and propylene carbonate, and contents of vinylethylene carbonate in the electrolytic solution were changed as shown in Examples 1-15 in Table 1. After preparing the electrolytic solution, the electrolytic solution, a copolymer wherein hexafluoro propylene was introduced in polyvinylidene fluoride by a ratio of 6.9%, and dimethyl carbonate, which is a dilution solvent, were mixed to prepare a sol electrolyte. The sol electrolyte was respectively applied to the cathode 21 and the anode 22 and dried to form the electrolyte layer 24 on the cathode 21 and the anode 22, respectively.

TABLE 1

| | EC:PC (mass ratio) | Contents of VEC (wt %) | Initial discharge capacity (mAh) | Cycle characteristics (%) | Low temperature characteristics (%) | Load characteristics (%) | Volume expansion rate (%) |
|---|---|---|---|---|---|---|---|
| Example 1 | 75:25 | 0.05 | 827 | 86 | 38 | 88 | — |
| Example 2 | 60:40 | 0.05 | 814 | 83 | 41 | 90 | 5 |
| Example 3 | 15:85 | 0.05 | 804 | 79 | 49 | 95 | — |
| Example 4 | 75:25 | 0.5 | 855 | 86 | 36 | 88 | — |
| Example 5 | 60:40 | 0.5 | 840 | 83 | 40 | 90 | 4 |
| Example 6 | 15:85 | 0.5 | 807 | 79 | 47 | 95 | — |
| Example 7 | 75:25 | 1.0 | 856 | 86 | 35 | 88 | — |
| Example 8 | 60:40 | 1.0 | 851 | 83 | 38 | 89 | 2 |
| Example 9 | 15:85 | 1.0 | 818 | 79 | 44 | 94 | — |
| Example 10 | 75:25 | 3.0 | 854 | 85 | 33 | 87 | — |
| Example 11 | 60:40 | 3.0 | 857 | 84 | 36 | 89 | 2 |
| Example 12 | 15:85 | 3.0 | 828 | 79 | 42 | 93 | — |
| Example 13 | 75:25 | 5.0 | 864 | 87 | 32 | 88 | — |
| Example 14 | 60:40 | 5.0 | 859 | 83 | 35 | 89 | 2 |
| Example 15 | 15:85 | 5.0 | 839 | 79 | 39 | 92 | — |

Next, the cathode 21 was cut in 50 mm×350 mm, and the anode 22 was cut in 52 mm×370 mm. After that, the cathode lead 11 was attached on the cathode 21 and the anode lead 12 was attached on the anode 22. Subsequently, the separator 23 was prepared. The separator 23, the cathode 21, the separator 23, and the anode 22 were layered in this order, and wound. The protective tape 25 was bonded to the winding body to obtain the electrode winding body 20. After that, the cathode lead 11 and the anode lead 12 were derived outside, and the electrode winding body 20 was enclosed in the exterior members 30A and 30B made of aluminum laminated films. In result, the secondary batteries as shown in FIGS. 1 and 2 were obtained.

Figure 3:
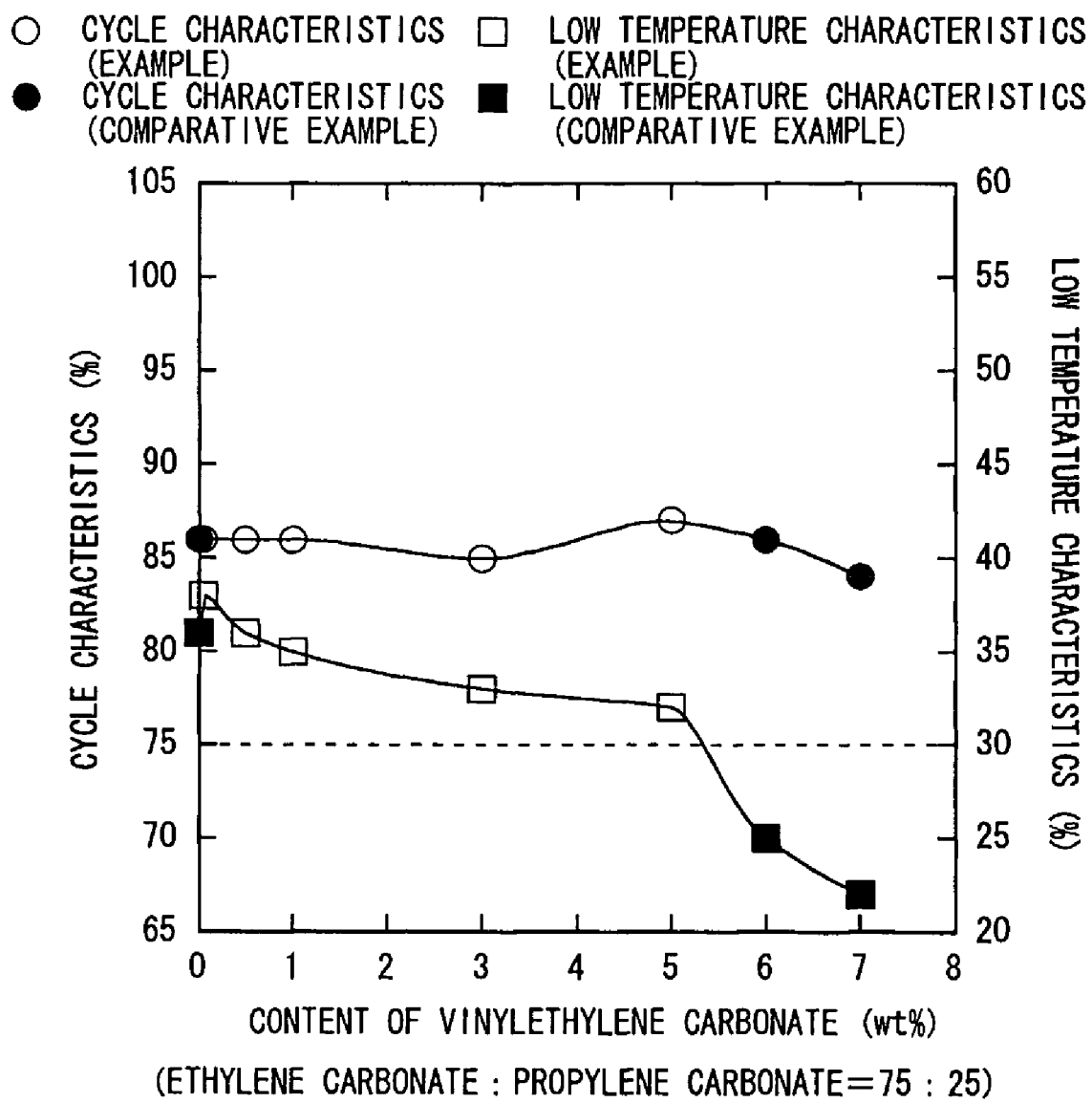
FIG. 3 is a property diagram which shows a relation between contents of vinylethylene carbonate and cycle characteristics/low temperature characteristics according to Examples 1, 4, 7, 10, and 13 of the invention.
Figure 4:
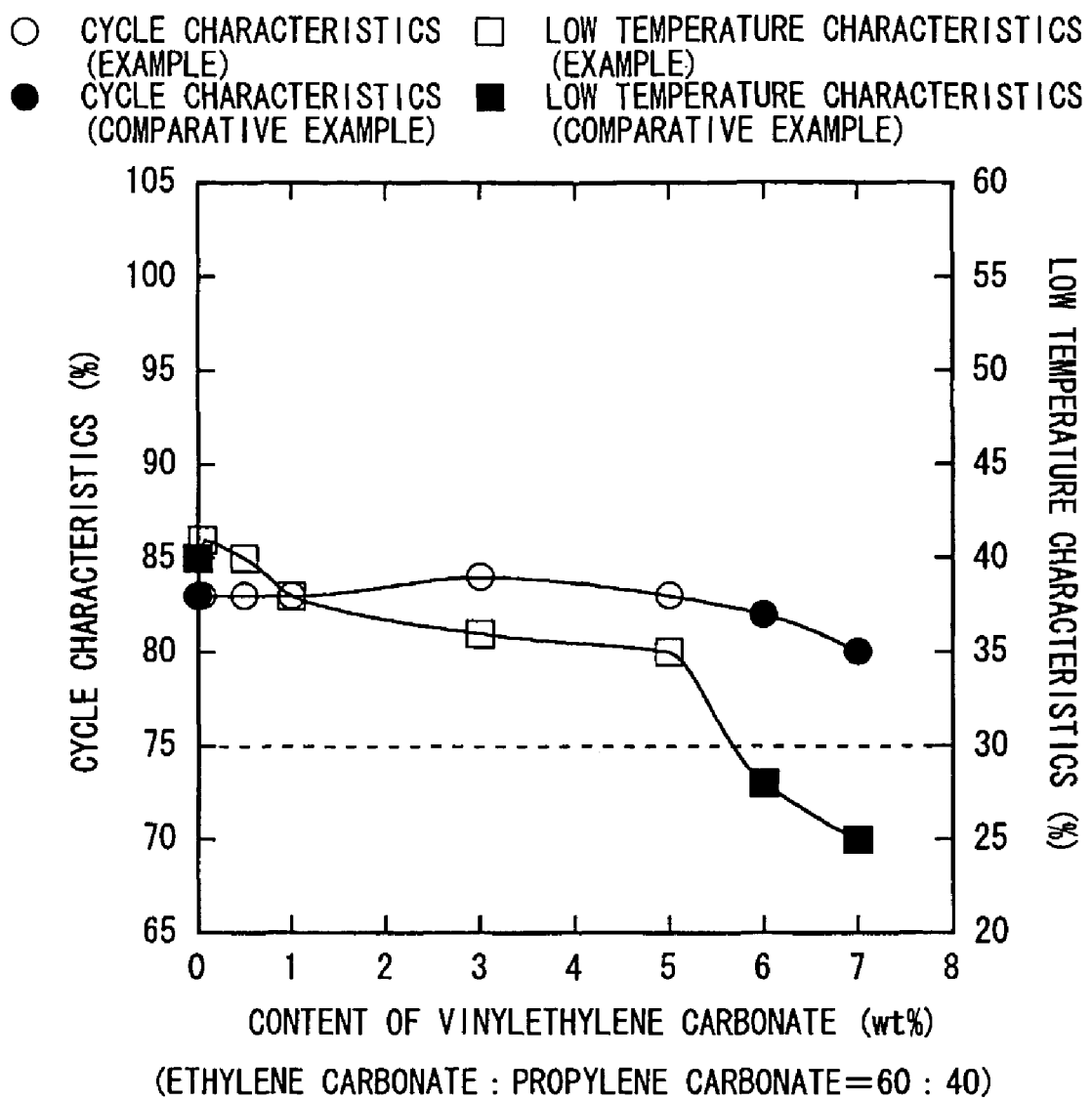
FIG. 4 is a property diagram which shows a relation between contents of vinylethylene carbonate and cycle characteristics/low temperature characteristics according to Examples 2, 5, 8, 11, and 14 of the invention.
Figure 5:
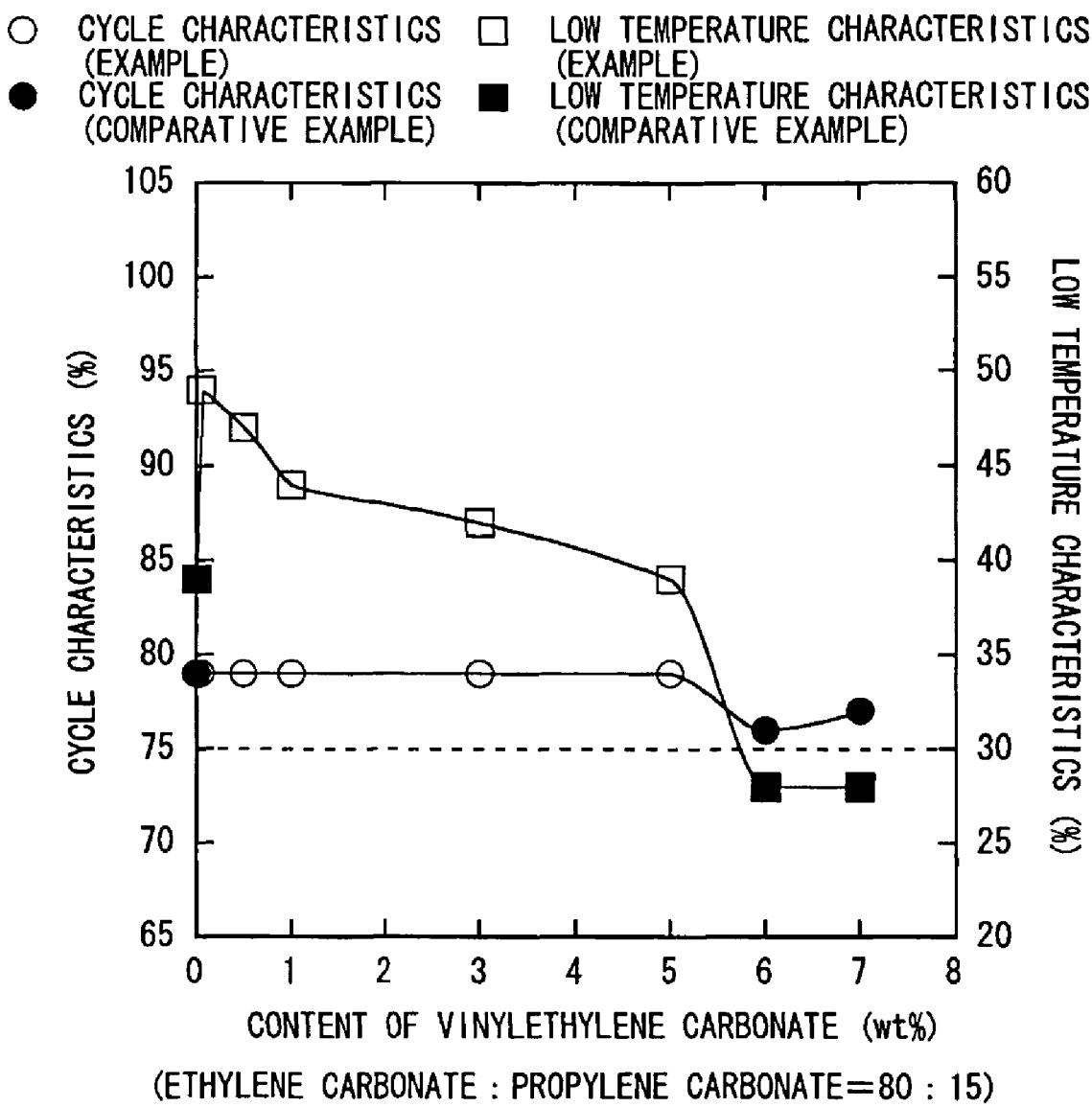
FIG. 5 is a property diagram which shows a relation between contents of vinylethylene carbonate and cycle characteristics/low temperature characteristics according to Examples 3, 6, 9, 12, and 15 of the invention.
Figure 6:
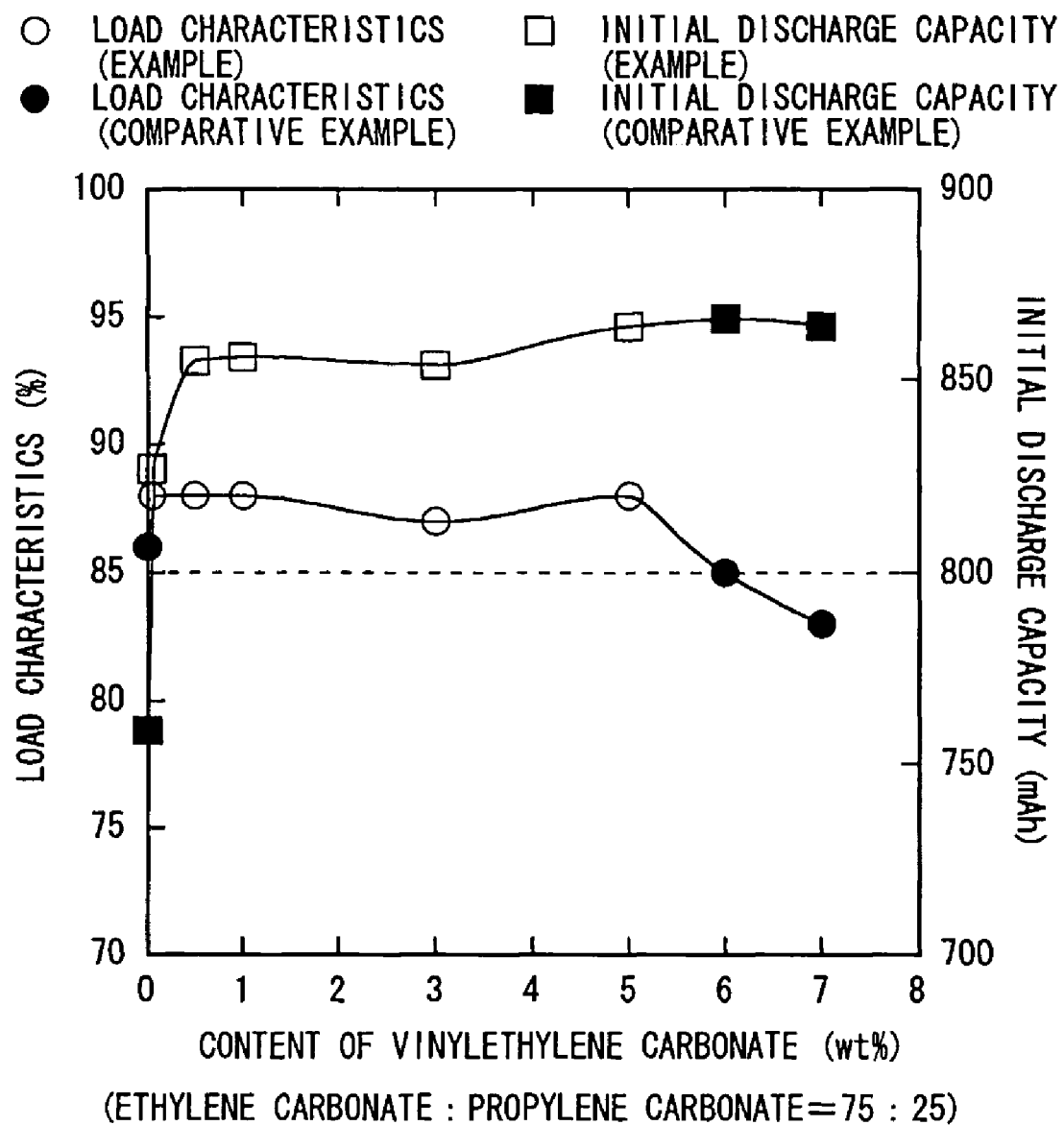
FIG. 6 is a property diagram which shows a relation between contents of vinylethylene carbonate and load characteristics/initial discharge capacities according to Examples 1, 4, 7, 10, and 13 of the invention.
Figure 7:
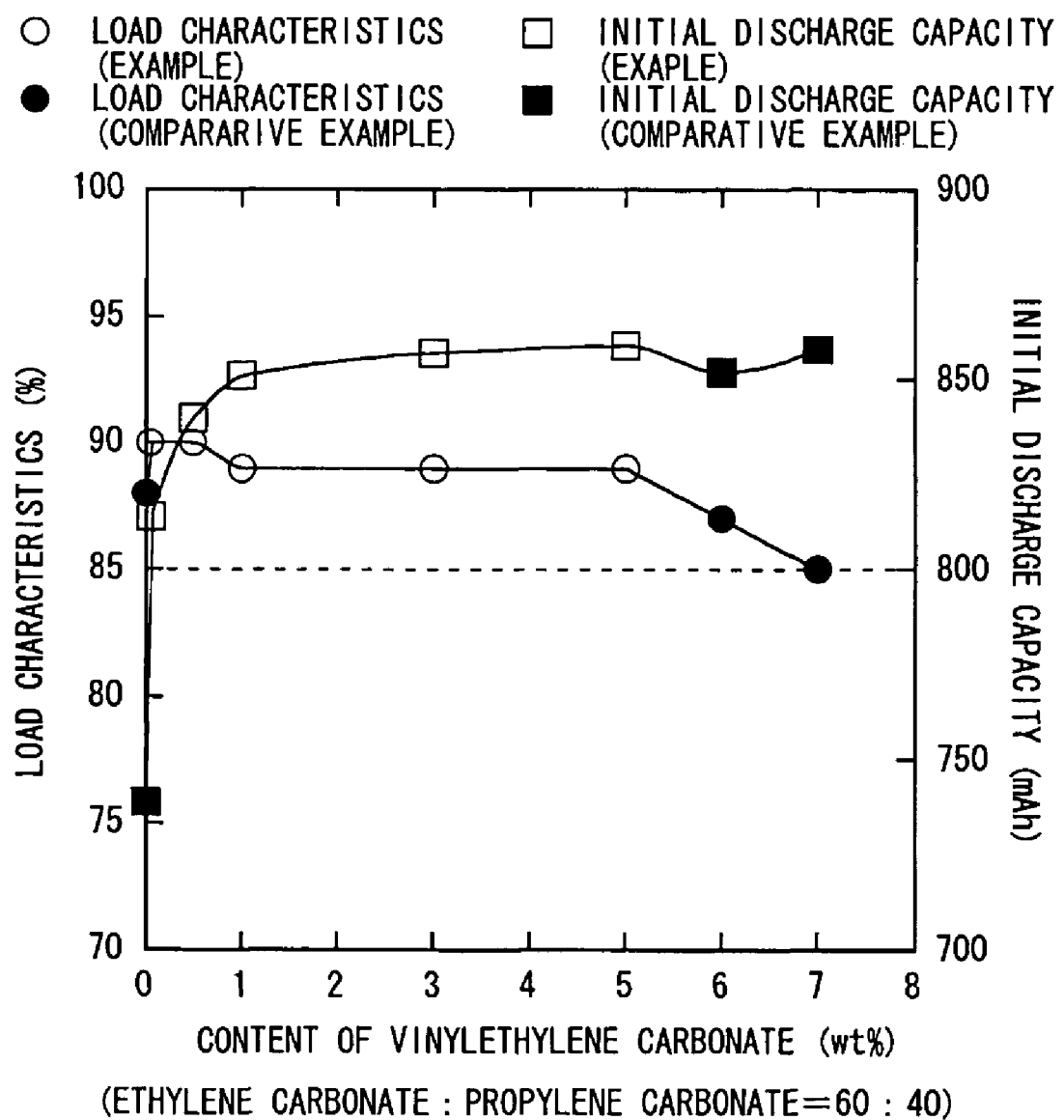
FIG. 7 is a property diagram which shows a relation between contents of vinylethylene carbonate and load characteristics/initial discharge capacities according to Examples 2, 5, 8, 11, and 14 of the invention.
Figure 8:
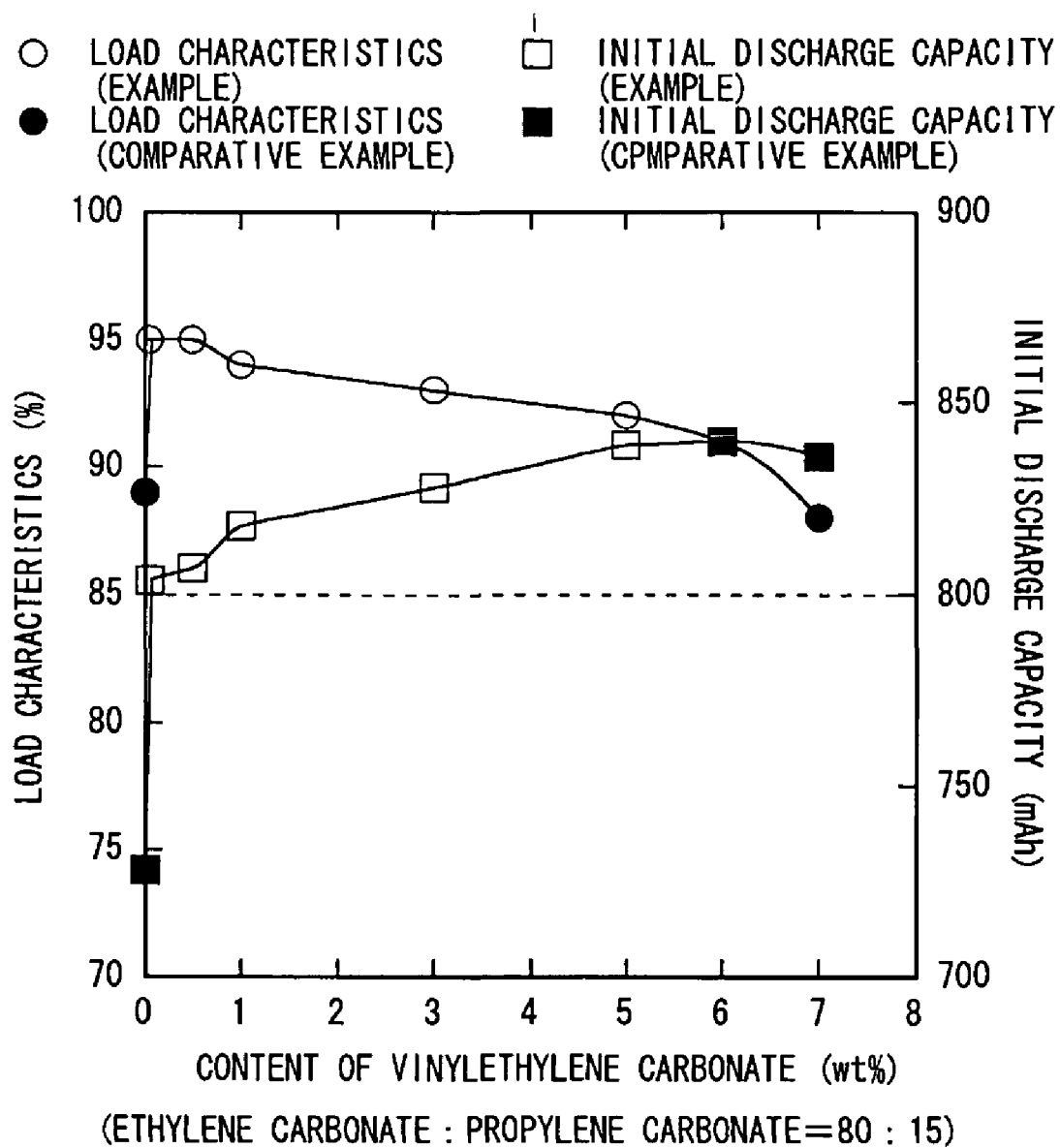
FIG. 8 is a property diagram which shows a relation between contents of vinylethylene carbonate and load characteristics/initial discharge capacities according to Examples 3, 6, 9, 12, and 15 of the invention.

Regarding the fabricated secondary batteries of Examples 1 to 15, charge and discharge tests were conducted to examine initial discharge capacity, cycle characteristics, low temperature characteristics, and load characteristics. The results are shown in Table 1. In FIG. 3, a relation between contents of vinylethylene carbonate and cycle characteristics/low temperature characteristics according to Examples 1, 4, 7, 10, and 13 is shown. In FIG. 4, a relation between contents of vinylethylene carbonate and cycle characteristics/low temperature characteristics according to Examples 2, 5, 8, 11, and 14 is shown. In FIG. 5, a relation between contents of vinylethylene carbonate and cycle characteristics/low temperature characteristics according to Examples 3, 6, 9, 12, and 15 is shown. In FIG. 6, a relation between contents of vinylethylene carbonate and load characteristics/initial discharge capacity according to Examples 1, 4, 7, 10, and 13 is shown. In FIG. 7, a relation between contents of vinylethylene carbonate and load characteristics/initial discharge capacity according to Examples 2, 5, 8, 11, and 14 is shown. In FIG. 8, a relation between contents of vinylethylene carbonate and load characteristics/initial discharge capacity according to Examples 3, 6, 9, 12, and 15 is shown.

Initial discharge capacity were obtained by firstly performing an initial constant current and constant voltage charge at 23° C., and then performing an initial constant current discharge at 23° C. In this regard, the constant current and constant voltage charge was performed firstly at a constant current of 0.08 A until a battery voltage reached 4.2 V, and then performed at a constant voltage of 4.2 V until a current reached 0.04 A. The constant current discharge was performed at a constant current of 0.16 A until a battery voltage reached 3 V.

After repeating 500 cycles of the constant current and constant voltage charge and the constant current discharge, cycle characteristics were obtained as a ratio of a discharge capacity at 500th cycle to a discharge capacity at 5th cycle. In this regard, the constant current and constant voltage charge was performed firstly at a constant current of 0.8 A until a battery voltage reached 4.2 V, and then performed at a constant voltage of 4.2 V until a current reached 0.08 A. The constant current discharge was performed at a constant current of 0.8 A until a battery voltage reached 3 V.

After performing the constant current and constant voltage charge at 23° C. and performing the constant current discharge at 23° C. and −20° C., low temperature characteristics were obtained as a ratio of a discharge capacity at −20° C. to a discharge capacity at 23° C. In this regard, the constant current and constant voltage charge was performed firstly at a constant current of 0.8 A until a battery voltage reached 4.2 V, and then performed at a constant voltage of 4.2 V until a current reached 0.08 A. The constant current discharge was performed at a constant current of 0.4 A until a battery voltage reached 3 V.

After performing firstly the constant current and constant voltage charge and then performing the constant current discharge at respective currents of 0.16 A and 2.4 A until a battery voltage reached 3V, load characteristics were obtained as a ratio of a discharge capacity when performing the constant current discharge at 2.4 A to a discharge capacity when performing the constant current discharge at 0.16 A. The constant current and constant voltage charge was performed firstly at a constant current of 0.8 A until a battery voltage reached 4.2 V, and then performed at a constant voltage of 4.2 V until a current reached 0.08 A.

Further, regarding the secondary batteries of Examples 1 to 15, the constant current and constant voltage charge was performed under the same conditions as in obtaining the initial discharge capacities to examine volume expansion rates in the initial charge. As representative examples, the results of Examples 2, 5, 8, 11, and 14 are shown in Table 1.

As Comparative examples 1 to 15 in relation to Examples 1 to 15, secondary batteries were fabricated in a manner similar to in Examples 1 to 15, except that mass ratios of ethylene carbonate and propylene carbonate and contents of vinylethylene carbonate in the electrolytic solution were changed as shown in Table 2. Comparative examples 1, 5, 6, 10, 11, and 15 correspond to Examples 1 to 15. Comparative examples 2, 7, and 12 correspond to Examples 1, 4, 7, 10, and 13. Comparative examples 3, 8, and 13 correspond to Examples 2, 5, 8, 11, and 14. Comparative examples 4, 9, and 14 correspond to Examples 3, 6, 9, 12, and 15.

Regarding the secondary batteries of Comparative examples 1 to 15, charge and discharge tests were also conducted as in Examples 1 to 15 to examine initial discharge capacity, cycle characteristics, low temperature characteristics, load characteristics, and volume expansion rates in initial charge. The results are shown in Table 2. Regarding the volume expansion rates, the result of Comparative example 3 is shown as a representative example. In FIG. 3, a relation between contents of vinylethylene carbonate and cycle characteristics/low temperature characteristics according to Comparative examples 2, 7, and 12 is shown. In FIG. 4, a relation between contents of vinylethylene carbonate and cycle characteristics/low temperature characteristics according to Comparative examples 3, 8, and 13 is shown. In FIG. 5, a relation between contents of vinylethylene carbonate and cycle characteristics/low temperature characteristics according to Comparative examples 4, 9, and 14 is shown. In FIG. 6, a relation between contents of vinylethylene carbonate and load characteristics/initial discharge capacities according to Comparative examples 2, 7, and 12 is shown. In FIG. 7, a relation between contents of vinylethylene carbonate and load characteristics/initial discharge capacities according to Comparative examples 3, 8, and 13 is shown. In FIG. 8, a relation between contents of vinylethylene carbonate and load characteristics/initial discharge capacities according to Comparative examples 4, 9, and 14 is shown.

TABLE 2

|  | EC:PC (mass ratio) | Contents of VEC (wt %) | Initial discharge capacity (mAh) | Cycle characteristics (%) | Low temperature characteristics (%) | Load characteristics (%) | Volume expansion rate (%) |
|---|---|---|---|---|---|---|---|
| Comparative example 1 | 80:20 | 0.0 | 780 | 87 | 28 | 84 | — |
| Comparative example 2 | 75:25 | 0.0 | 759 | 86 | 36 | 86 | — |
| Comparative example 3 | 60:40 | 0.0 | 739 | 83 | 40 | 88 | 10 |
| Comparative example 4 | 15:85 | 0.0 | 728 | 79 | 39 | 89 | — |
| Comparative example 5 | 10:90 | 0.0 | 711 | 76 | 42 | 91 | — |

TABLE 2-continued

|  | EC:PC (mass ratio) | Contents of VEC (wt %) | Initial discharge capacity (mAh) | Cycle characteristics (%) | Low temperature characteristics (%) | Load characteristics (%) | Volume expansion rate (%) |
|---|---|---|---|---|---|---|---|
| Comparative example 6 | 80:20 | 6.0 | 858 | 86 | 22 | 81 | — |
| Comparative example 7 | 75:25 | 6.0 | 866 | 86 | 25 | 85 | — |
| Comparative example 8 | 60:40 | 6.0 | 852 | 82 | 28 | 87 | — |
| Comparative example 9 | 15:85 | 6.0 | 840 | 76 | 28 | 91 | — |
| Comparative example 10 | 10:90 | 6.0 | 833 | 72 | 29 | 89 | — |
| Comparative example 11 | 80:20 | 7.0 | 852 | 85 | 15 | 80 | — |
| Comparative example 12 | 75:25 | 7.0 | 864 | 84 | 22 | 83 | — |
| Comparative example 13 | 60:40 | 7.0 | 858 | 80 | 25 | 85 | — |
| Comparative example 14 | 15:85 | 7.0 | 836 | 77 | 28 | 88 | — |
| Comparative example 15 | 10:90 | 7.0 | 826 | 73 | 29 | 85 | — |

As evidenced by Tables 1, 2 and FIGS. 3 to 8, in Examples 1 to 15, wherein vinylethylene carbonate was contained in the range of 0.05 wt % to 5.0 wt %, initial discharge capacities were 800 mAh or more, cycle characteristics were 75% or more, low temperature characteristics were 30% or more, and load characteristics were 85% or more. That is, regarding initial discharge capacities, cycle characteristics, low temperature characteristics, and load characteristics, higher values than previously set rated values were obtained. Meanwhile, in Comparative examples 1 to 15, wherein vinylethylene carbonate was not contained, or vinylethylene carbonate was contained in the range of more than 5.0 wt %, some values of initial discharge capacities, cycle characteristics, low temperature characteristics, and load characteristics were less than the rated values.

As evidenced by Examples 2, 5, 8, 11, and 14 and Comparative example 3, volume expansion rates after the initial charge were as small as 5% or less in Examples 2, 5, 8, 11, and 14. Meanwhile, in Comparative example 3, the volume expansion rate after the initial charge was as high as 10%. That is, it was found that when the electrolytic solution contained vinylethylene carbonate in the range of 0.05 wt % to 5 wt %, excellent discharge capacity, cycle characteristics, low temperature characteristics, and load characteristics could be obtained at once, and swollenness of the battery could be prevented.

As evidenced by Comparative examples 6 to 15, when vinylethylene carbonate was too small in quantity, initial discharge capacities and cycle characteristics tended to lower, and when propylene carbonate was too small in quantity, low temperature characteristics and load characteristics tended to lower. That is, it was found that it was preferable that the electrolytic solution contained ethylene carbonate and propylene carbonate by a mass ratio of ethylene carbonate: propylene carbonate=15-75:85-25.

While the invention has been described with reference to the embodiment and examples, the invention is not limited to the foregoing embodiment and examples, and various modifications may be made. For example, though in the foregoing embodiment and examples, case using the high molecular weight compound as a holding body has been described. However, a mixture of an inorganic conductor such as lithium nitride and lithium phosphate and a high molecular weight compound can be used.

Further, in the foregoing embodiment and examples, the secondary battery, wherein the electrode winding body 20 is enclosed inside of the film exterior members 30A and 30B has been described. However, the invention can be applied to batteries such as coin type batteries and button type batteries.

As described above, according to the electrolyte of the invention or the battery of the invention, the electrolyte contains the electrolytic solution containing at least one from the group consisting of vinylethylene carbonate and its derivatives in the range of 0.05 wt % to 5 wt % in total. Therefore, excellent capacities, cycle characteristics, load characteristics, and low temperature characteristics can be obtained at once.

In particular, according to the electrolyte of one aspect of the invention or the battery of one aspect of the invention, the electrolytic solution further contains ethylene carbonate and propylene carbonate by a mass ratio of ethylene carbonate: propylene carbonate=15-75:85-25. Therefore, higher effects can be obtained.

Obviously many modifications and variations of the present invention are possible in the light of the above teachings. It is therefore to be understood that within the scope of the appended claims the invention may be practiced otherwise than as specifically described.

What is claimed is:

1. An electrolyte, comprising:
    an electrolytic solution consisting of at least one selected from the group consisting of vinylethylene carbonate and its derivatives in the range of 0.05 wt % to 5 wt % in total; and
    a polymer,
    wherein,
    said polymer is gelatinized with said electrolytic solution, and said electrolytic solution is diffused or held within said polymer,
    said electrolytic solution consists of 95 wt % or more of a combination of ethylene carbonate and propylene carbonate to percentage complement the at least one selected from the group consisting of vinylethylene carbonate and its derivatives, and said polymer contains any one from the group consisting of polyethylene oxide, polypropylene oxide, and poly methacrylic nitrile as a monomer unit.

2. An electrolyte according to claim 1, wherein a mass ratio of ethylene carbonate to propylene carbonate ranges from about 15/85 to about 75/25.

3. A battery comprising:
a cathode;
an anode; and
an electrolyte,
wherein,
the electrolyte contains an electrolytic solution consisting of at least one from the group consisting of vinylethylene carbonate and its derivatives in the range of 0.05 wt % to 5 wt % in total, and a polymer, said polymer is gelatinized with said electrolytic solution, and said electrolytic solution is diffused or held within said polymer, said electrolytic solution consists of 95 wt % or more of a combination of ethylene carbonate and propylene carbonate to percentage complement the at least one selected from the group consisting of vinylethylene carbonate and its derivatives, and said polymer contains any one from the group consisting of polyethylene oxide, polypropylene oxide, and poly methacrylic nitrile as a monomer unit.

4. A battery according to claim 3, wherein the electrolytic solution contains ethylene carbonate and propylene carbonate with a mass ratio of ethylene carbonate to propylene carbonate ranging from about 15/85 to about 75/25.

* * * * *